United States Patent [19]

Hagmann

[11] Patent Number: 4,774,716
[45] Date of Patent: Sep. 27, 1988

[54] METHOD FOR THE TRANSMISSION OF DIGITAL DATA

[75] Inventor: Walter Hagmann, Dättwil, Switzerland

[73] Assignee: BBC Brown, Boveri & Company, Limited, Baden, Switzerland

[21] Appl. No.: 938,958

[22] Filed: Dec. 8, 1986

[30] Foreign Application Priority Data

Jan. 22, 1986 [CH] Switzerland ............... 244/86-9

[51] Int. Cl.⁴ .................. H04L 27/22; H04L 1/08
[52] U.S. Cl. .................... 375/83; 375/100; 375/102; 380/34
[58] Field of Search .......... 375/38, 40, 1, 96, 102, 375/100, 58, 52, 46, 79, 57, 2.2, 83, 53, 86; 371/69, 36, 68, 43; 380/33, 34, 37, 36; 455/52

[56] References Cited

U.S. PATENT DOCUMENTS 3,795,865 3/1974 Armstrong ............... 375/1
4,066,964 1/1978 Costanza et al. .......... 375/52
4,179,586 12/1979 Mathews, Jr. et al. ..... 380/33
4,550,414 10/1985 Guinon et al. ........... 375/1
4,583,048 4/1986 Gumacos et al. ......... 375/96

Primary Examiner—Robert L. Griffin
Assistant Examiner—Marianne Huseman
Attorney, Agent, or Firm—Oblon, Fisher, Spivak, McClelland & Maier

[57] ABSTRACT

A method for the transmission of digital data by means of phase modulation (PSK) and "frequency hopping", in which symbols are transmitted several times in different transmission sections as synchronization information for coherent demodulation, and wherein weighting factors taking into consideration the existence and influence of a disturbance source are calculated for each symbol. The symbol values are multiplied by these weighting factors before the values of corresponding symbols are linearly combined and utilized for evaluation.

4 Claims, 1 Drawing Sheet

METHOD FOR THE TRANSMISSION OF DIGITAL DATA

BACKGROUND OF THE INVENTION

1. Field of the Invention

The present invention relates to a method for the transmission of digital data wherein data are transmitted by m permitted discrete phase values by phase modulation of a carrier frequency.

2. Discussion of Background

Phase modulation, briefly called PSK (Phase Shift Keying) in the text which follows, is a transmission method in which the information is accommodated in the absolute phase of a carrier oscillation. By its nature, such a modulation method is little suited for communication channels in which rapid phase fluctuations or large phase shifts occur.

In general, disturbances in the channels used, which are restricted to a narrow frequency band, can be effectively counteracted by pseudo-randomly changing the carrier frequency in steps over a relatively large set of frequencies. In this method, briefly called FH (Frequency Hopping), a particular number of data bits are transmitted on each carrier frequency before the system skips to the next carrier frequency.

Since FH usually entails a random change of carrier phase during the change of the carrier frequency, which can be caused either by the modulator used or by the channel itself, it is found that, under normal circumstances, PSK and FH are not compatible, since the random phase change is an obstacle to coherent demodulation.

Nevertheless, the literature (Simon, M.K. et Polydoros, A., IEEE Transactions On Communications, Vol. COM-29, No. 11, Nov. 1981, p. 1644 ff) contains investigations conducted on a combined FH/PSK system without, however, discussing the technical implementation of coherent demodulation, that is to say, of the synchronization between transmitter and receiver.

In the Swiss Patent Application No. 3068/85-1, a FH/PSK method has been proposed in which, for the purpose of synchronizing the receiver, all modulation symbols are transmitted several times in a particular manner, the symbols being repeated in transmission sections having different carrier frequencies.

From the multiple transmission of the symbols, detailed information on the position of the carrier phase in each transmission section assigned to a carrier frequency can then be obtained.

Compared with non-coherent transmission methods, the FH/PSK method with coherent demodulation has significant advantages. These advantages are retained even in the presence of disturbance sources if the influence of the disturbance sources or their presence can be detected and taken into account.

SUMMARY OF THE INVENTION

The present invention has the object of modifying coherent FH/PSK methods described, to the extent that the recurrence of disturbance sources is advantageously taken into consideration during data transmission.

The above object is achieved according to the present invention by providing a method for the transmission of digital data, in which the data are transmitted by means of m discrete, permitted phase values by phase modulation of a carrier frequency; the consecutive sequence of transmitted symbols is subdivided into individual transmission sections of fixed length, which transmission sections in each case contain a plurality of symbols; a fixed carrier frequency is used within each transmission section and the carrier frequency is changed in steps from one transmission section to the next; and the data are transmitted several times in order to enable coherent demodulation to be performed, different transmission sections being used, wherein, in order to take into consideration the influence of a disturbance source on the transmission, a means phase value ($\phi_i$) is determined from the symbols of the transmission section for each transmission section; the phase difference ($\Delta\phi_{ik}$) between the symbol phase ($\phi_{ik}$) and the mean phase value ($\phi_i$) of the associated transmission section is determined for each symbol within a transmission section; a weighing factor ($W_{ik}$, $W_{i'k'}$) which functionally depends on the phase difference ($\Delta\phi_{ik}$) multiplied by m/2, characterizing the reliability of the transmission, is allocated to each symbol and in which the functional dependence of the weighting factor is selected in such a manner that $$W_{ik} = \infty, \text{ if } \frac{m}{2} \cdot \Delta\phi_{ik} \bmod \pi = 0$$

and $$W_{ik} = 0, \text{ if } \frac{m}{2} \cdot \Delta\phi_{ik} \bmod \pi = \frac{\pi}{2};$$

and during the demodulation, the symbol values of the symbols are first multiplied by the associated weighting factor ($W_{ik}$, $W_{i'k'}$) and the final values are then determined from a linear combination of corresponding symbol values.

The assumed multiple transmissions makes available redundant information from various transmission sections having different carrier frequencies, which information is differently influenced by the presence of a disturbance source. The reliability of the information from one transmission section becomes greater with increasing closeness of the phase of the associated symbol to one of the m discrete permitted phase values, referred to the carrier phase of the respective transmission section.

From this closeness to the permitted values, a weighting factor is then derived and allocated to the corresponding symbol so that the evaluation of the transmitted information includes to a particularly strong extent those symbols which are particularly close to one of the permitted phase values.

In this arrangement, the reference phase used for one transmission section is a mean phase value which is obtained after imaging the m permitted phase values onto a single phase value by averaging over all symbols of one transmission section.

From the phase value of each symbol and the mean phase value of the associated transmission section, a phase difference is obtained which would correspond to one of the m permitted phase values if the transmission were ideal, but deviates to a greater or lesser extent from the m phase values in reality.

The weighting factor for each symbol has such a functional dependence on the phase difference multiplied by m/2 that it becomes infinite when the multiplied modulo n phase difference becomes 0 and becomes 0 when the multiplied modulo $\pi$ phase difference assumes the value $\pi/2$.

It has been found to be particularly advantageous to select the functional dependence as the inverse of the tangent function, that is to say as 1/tan x.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

The invention is based on a FH/PSK method including m discrete, permitted phase values, also briefly called a FH/m-PSK method. The transmission scheme of such a method in the frequency versus time diagram is shown in section in FIG. 1.

Figure 1:
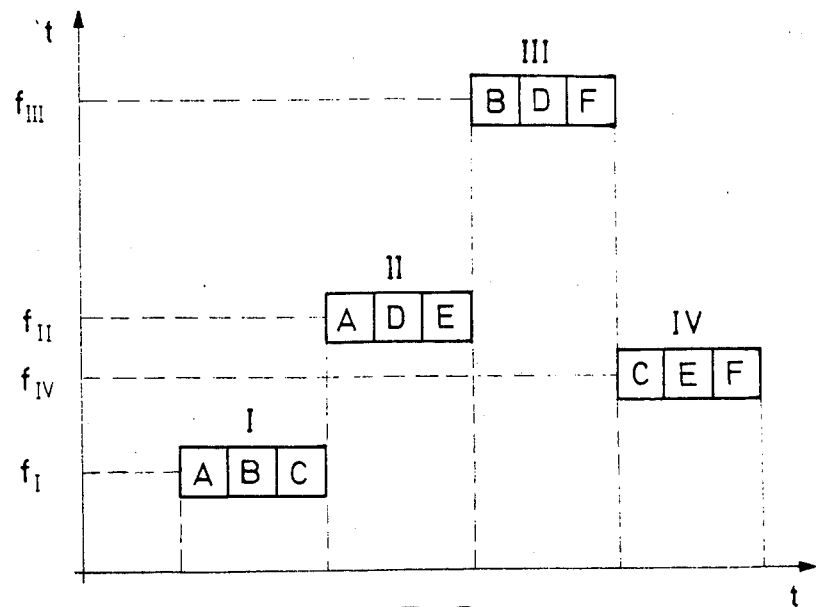
FIG. 1 is a diagrammatic representation of several transmission sections with different carrier frequencies and symbols, transmitted several times, in a frequency versus time diagram.

In FIG. 1, the four transmission sections I, ..., IV have been selected from a consecutive sequence of transmission sections. In the example of FIG. 1, all transmission sections, also called blocks, are of equal length and contain an equal number of symbols, namely, in each case three symbols A, ..., F.

A different carrier frequency $f_I, \ldots f_{IV}$ is allocated to each transmission section. The symbols A, B, C of the first transmission section are transmitted by phase modulation of the carrier frequency $f_I$, the symbols A, D, E of the transmission section II are transmitted by modulation of the carrier frequency $f_{II}$, and so forth.

Each of the six symbols A, ..., F is transmitted several times, twice in the example of FIG. 1 (dual diversity). Thus, symbol A is contained in transmission sections I and II, symbol C in transmission sections I and IV, and so forth.

For the purpose of coherent demodulation, the carrier phase must then be determined for each of the four transmission sections I, ..., IV to be able to determine for each symbol the phase relationship relative to the carrier phase. It must be basically assumed that the actual phase values do not accurately correspond to the m permitted phase values but are dispersed around these values.

Figure 2:
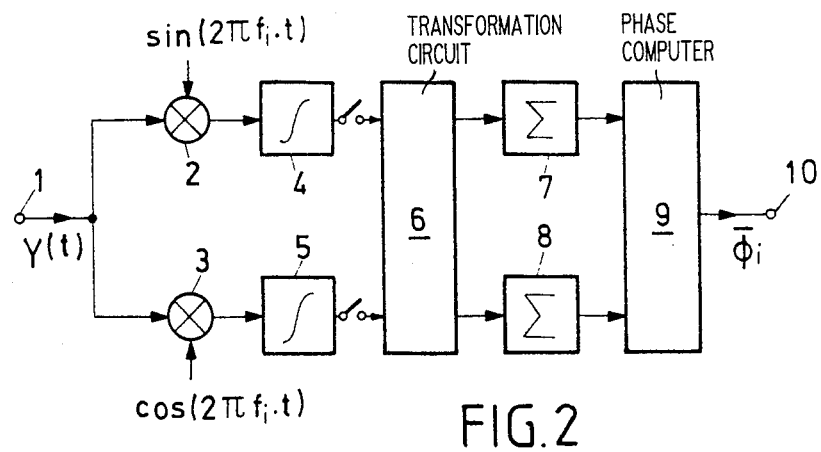
FIG. 2 is a block diagram of an illustrative embodiment of an arrangement, known per se, for determining the average phase values in the block diagram.

The carrier phase of each transmission section can then be determined by an estimation method such as is known, e.g., from the article by A. J. Viterbi and A. M. Viterbi, IEEE Transactions On Information Theory, Vol. IT-29, No. 4, July 1983, p. 543 ff. A feedbackless arrangement for carrying out such an estimation method is shown in FIG. 2.

The phase-modulated received signal y(t) passes via signal input 1 to two multipliers 2 and 3 in which it is multiplied by a $\sin(2\pi f_i t)$ and $\cos(2\pi f_i t)$ function respectively, and is thus split into its two quadature branches. In this process, the carrier frequency $f_i$ is precisely the carrier frequency which has been used in the transmission section to be evaluated, that is to say, e.g., $f_i = f_{II}$ during the evaluation of transmission section II.

Since the phase can assume m different nominal values in each transmission section in accordance with the assumption, the carrier phase can be determined by averaging over the various symbols of a transmission section only if first the m permitted phase values have been imaged onto one phase value by a transformation so that the phase values of all symbols of a block are dispersed around only one nominal value.

In the case of m equidistant phase values, such imaging can be achieved by raising the received signal by the power of m.

In an arrangement according to FIG. 2, in which the received signal is split into its quadrature branches and is separately processed in accordance to quadrature branches, a transformation from cartesian to polar coordinates must first be performed in a transformation circuit 6 and the phase must then be multiplied by m as is explained in greater detail in the article by Viterbi and Viterbi.

In front of the transformation circuit 6, two integrators 4 and 5 are also provided which filter out the frequency components in the output signals of the multipliers 2 and 3.

Between the integrators 4 and 5 and the transformation circuit, two switches diagrammatically indicate that the quadrature branches are in each case sampled at the optimum sampling time.

At the outputs of the transformation circuit 6, a pair of values, which is dispersed around a particular mean pair of values characteristic of the respective transmission section, is available for each symbol of a transmission section.

The values of the pairs of values are separately summed for all symbols of a transmission section in two summing circuits 7 and 8 and are used for forming mean values from which, by applying the inverses of the tangent gent function in a phase computer 9, a mean phase value $\phi_i$ for the i-th transmission section is derived which can be picked up for further use at the phase output 10. Details relating to this method can be found in the article by Viterbi and Viterbi.

Due to the described transformation of the quadrature branches in the transformation circuit 6, the mean phase value $\phi_i$ has a m-fold phase uncertainty, that is to say it is degenerated by a factor of m. This degeneration can then be eliminated by evaluating the multiple transmission of each symbol in various transmission sections. The detailed method of this evaluation is the subject matter of the Swiss Patent Application No. 3068/85-1 already mentioned and will not be explained in greater detail at this point.

In the same manner as a mean phase value $\phi_i$ degenerated by a factor of m can be obtained as reference for each transmission section in an arrangement according to FIG. 2, a symbol phase $\phi_{ik}$ can be allocated to each symbol A, ..., F by a similar arrangement in which the transformation circuit 6 and the summing circuits 7 and 8 have been omitted, index i identifying the transmission section and index k identifying the symbol within the transmission section.

In the case of an ideal transmission, all symbol phases $\phi_{ik}$ assume one of m fixed phase values. Correspondingly, a mean phase value $\phi_i$ without dispersion is obtained. The phase differences $\Delta\phi_{ik} = /\phi_{ik} - \phi_i/$ are equal to the m permitted phase values. In the case of disturbances, in contrast, a more or less large dispersion around the permitted phase values is obtained which, according to the invention, is utilized for allocating to the symbols A, ... F particular weighting factors $W_{ik}$ which are an expression of the reliability of the respective symbol received.

The weighting factors $W_{ik}$ depend on the phase differences $\Delta\phi_{ik}$ with a functional dependence which is selected in such a manner that $$W_{ik} = \infty, \text{ if } \frac{m}{2} \cdot \Delta\phi_{ik} \text{mod } \pi = 0 \quad (1)$$

$$W_{ik} = 0, \text{ if } \frac{m}{2} \cdot \Delta\phi_{ik} \text{mod } \pi = \frac{\pi}{2}$$

holds true.

This functional dependence can be advantageously achieved by the inverse of the tangent function, that is to say $f(x)=1/\tan(x)$. It ensures that the weighting factor $W_{ik}=0$ is allocated to a symbol the phase difference $\Delta\phi_{ik}$ of which is located between two adjacent values of the m permitted phase values, that is to say that this symbol is not taken into consideration during the evaluation but that, on the other hand, the weighting factor $W_{ik}=\infty$ is allocated to a symbol, the phase difference $\Delta\phi_{ik}$ of which exactly corresponds to one of the m permitted phase values, that is to say that this symbol receives absolute priority before identical symbols from other transmission sections during the evaluation.

Figure 3:
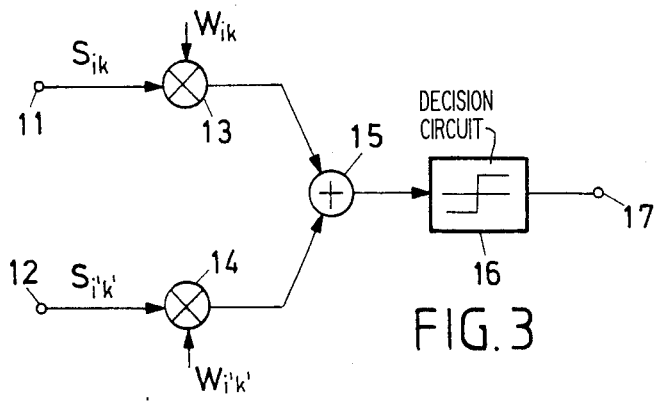
FIG. 3 is a schematic diagram of an illustrative arrangement for processing the weighted phase information items.

Once the weighting factors $W_{ik}$ have been determined for the various symbols and transmission sections, further processing can take place, e.g. in an arrangement according to FIG. 3. In the present case, each symbol (A, B, C ...) is transmitted twice. Therefore, a first symbol value $S_{ik}$ and a second symbol value $S_{i'k'}$ ($S_{ik}$ and $S_{i'k'}$ being associated with the same symbol (A, B, C ...) transmitted in different transmission sections (I, II, III, IV)) pass via two symbol inputs 11 and 12 to two multipliers 13 and 14 where they are multiplied by the associated weighting factors $W_{ik}$ and $W_{i'k'}$ determined in accordance with the method described above.

In a subsequent summing circuit 15, a linear combination is formed from the multiplied values and the result is supplied to a decision circuit 16, known per se, which, for example, makes a so-called threshold decision for m=2 (hard decision) to obtain the final decision on the information bit values.

The multiple transmission of information items with an additional weighting taking into consideration a disturbance source achieves as extensive as possible a suppression of the disturbing influence. At the data output 17, information items can then be picked up which are largely free of disturbance.

In this manner, the advantages of an FH/m-PSK system operating coherently are largely maintained even in the presence of a disturbance source.

The method can be implemented particularly favorably if the data are transmitted twice in each case, in which arrangement two symbols of a transmission section are never repeated together in another transmission section, because the channel capacity is utilized extremely well in this case in spite of the multiple transmission method used.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method for demodulating received data modulated in a received data signal, said signal being composed of several transmission sections of fixed length, each transmission section having a fixed carrier frequency, which is changing in steps from one transmission section to the next and is modulated by means of m discrete permitted phase values by phase modulation of a carrier frequency, each transmission section containing the data in the form of a plurality of symbols and said signal containing the data to be transmitted plural times, including using different transmission sections for the same data, said method comprising the steps of:

determining for each transmission section a mean phase value ($\phi_i$);

determining the phase difference ($\Delta\phi_{ik}$) between the symbol phase ($\phi_{ik}$) and the mean phase value ($\phi_i$) of the associated transmission section for each symbol within a transmission section;

allocating a weighting factor ($W_{ik}$, $W_{i'k'}$) which functionally depends on the phase difference ($\Delta\phi_{ik}$) multiplied by m/2 and which characterizes the reliability of the transmission, to each symbol;

selecting the functional dependence of each weighting factor such that $$W_{ik} = \infty, \text{ if } \frac{m}{2} \cdot \Delta\phi_{ik} \text{mod } \pi = 0$$

and $$W_{ik} = 1, \text{ if } \frac{m}{2} \cdot \Delta\phi_{ik} \text{mod } \pi = \frac{\pi}{2} \text{ ; and}$$

demodulating the received data by first multiplying the symbol values of the symbols by the associated weighting factor ($W_{ik}$, $W_{i'k'}$) and then forming a linear combination of corresponding weighted symbol values to determine the received data.

2. Method as claimed in claim 1, wherein the functional dependence of the weighting factors ($W_{ik}$, $W_{i'k'}$) on the phase difference ($\Delta\phi_{ik}$) multiplied by m/2 corresponds to the inverse of the tangent function.

3. Method as claimed in claim 1, wherein, for the purpose of determining the mean phase value ($\phi_i$), the method further comprises:

imaging the m discrete, permitted phase values onto one phase value by a transformation in a feedbackless phase detector; and forming the mean phase value ($\phi_i$) as the mean value of the transformed phase relationships of all symbols of a transmission section.

4. Method as claimed in claim 3, comprising:

splitting the phase-modulated received signal into quadrature branches; and averaging separately the quadrature branches.

* * * * *